US011403912B2

(12) United States Patent
Cronin

(10) Patent No.: US 11,403,912 B2
(45) Date of Patent: Aug. 2, 2022

(54) METHOD OF NOTIFYING A USER ABOUT PLACING AN UNCOMMON BET

(71) Applicant: AdrenalineIP, Washington, DC (US)

(72) Inventor: John Cronin, Jericho, VT (US)

(73) Assignee: AdrenalineIP, Washington, DC (US)

(*) Notice: Subject to any disclaimer, the term of this patent is extended or adjusted under 35 U.S.C. 154(b) by 0 days.

(21) Appl. No.: 17/340,490

(22) Filed: Jun. 7, 2021

(65) Prior Publication Data

US 2022/0148362 A1 May 12, 2022

Related U.S. Application Data

(60) Provisional application No. 63/112,877, filed on Nov. 12, 2020.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ........ *G07F 17/323* (2013.01); *G07F 17/3288* (2013.01)

(58) Field of Classification Search

USPC .................................... 463/1, 20, 22, 25, 30

See application file for complete search history.

(56) References Cited

U.S. PATENT DOCUMENTS

2014/0297360 A1* 10/2014 Cicchello .............. G06Q 50/34 705/7.28
2015/0279155 A1* 10/2015 Chun .................. G07F 17/3234 463/25
2017/0345260 A1* 11/2017 Strause ............... G07F 17/3244
2020/0357234 A1* 11/2020 Higgins ................ G06F 21/316

OTHER PUBLICATIONS

International Search Report and Written Opinion dated Jan. 11, 2022 in corresponding International Patent Application No. PCT/US2021/059195; 8 pages.

* cited by examiner

*Primary Examiner* — Adetokunbo O Torimiro
(74) *Attorney, Agent, or Firm* — Maier & Maier, PLLC

(57) ABSTRACT

The application determines what the typical wager is. The application flags a new wager is uncommon. The application notifies the user of the uncommon wager.

20 Claims, 5 Drawing Sheets

Uncommon bet notification system

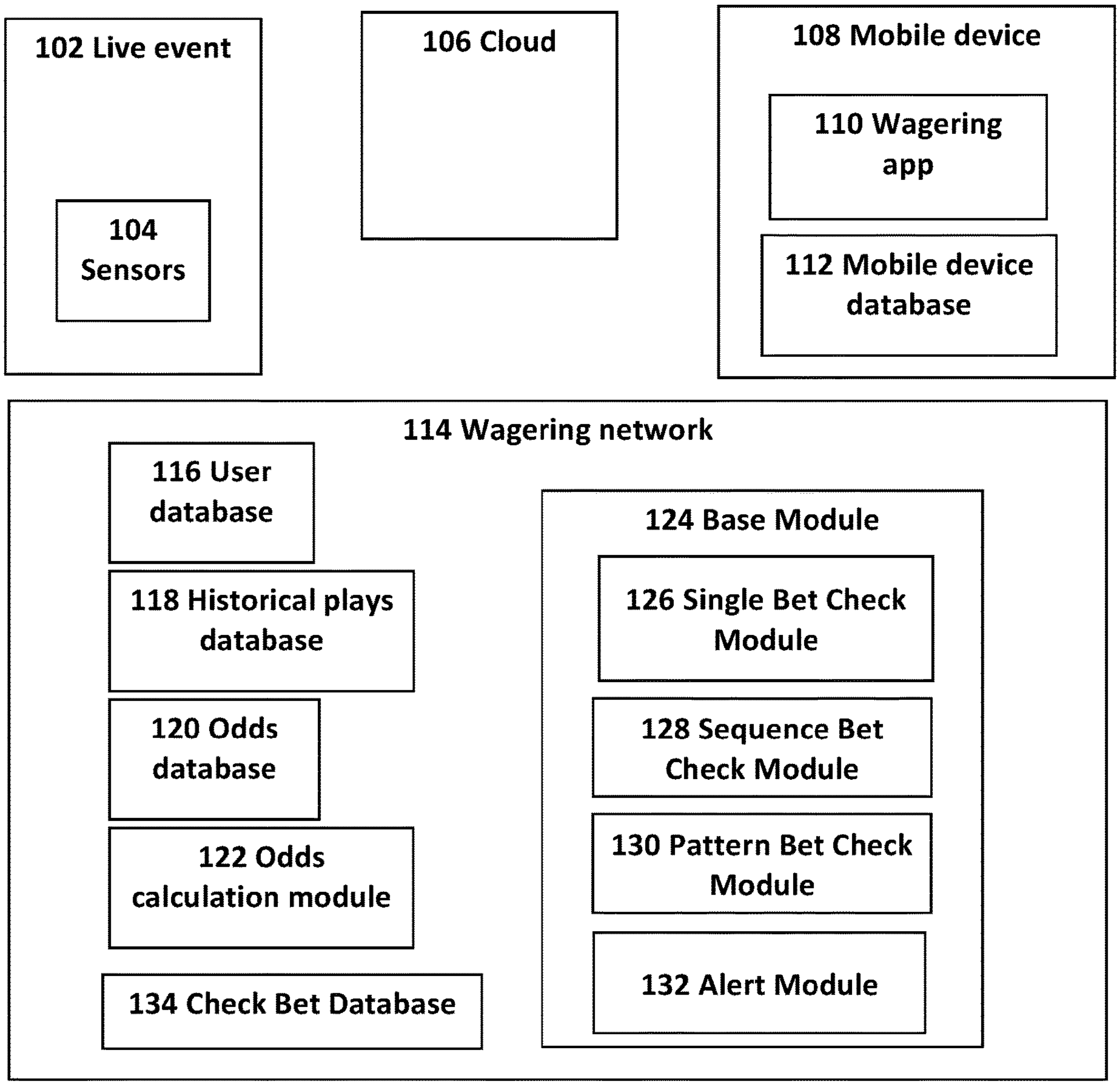
Fig.1 Uncommon bet notification system

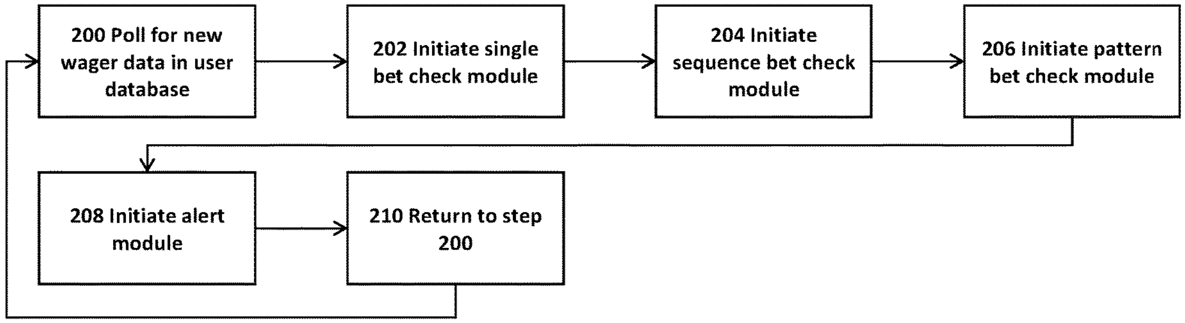
Fig.2 Base Module
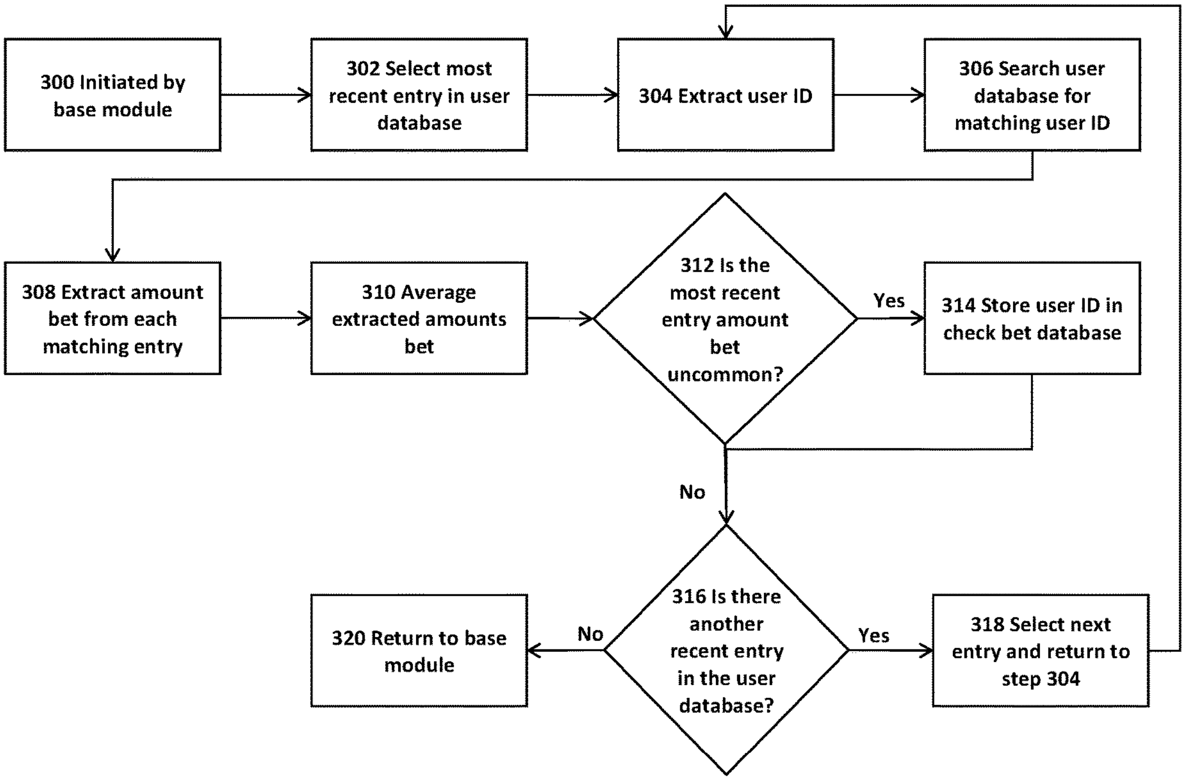
Fig.3 Single Bet Check Module

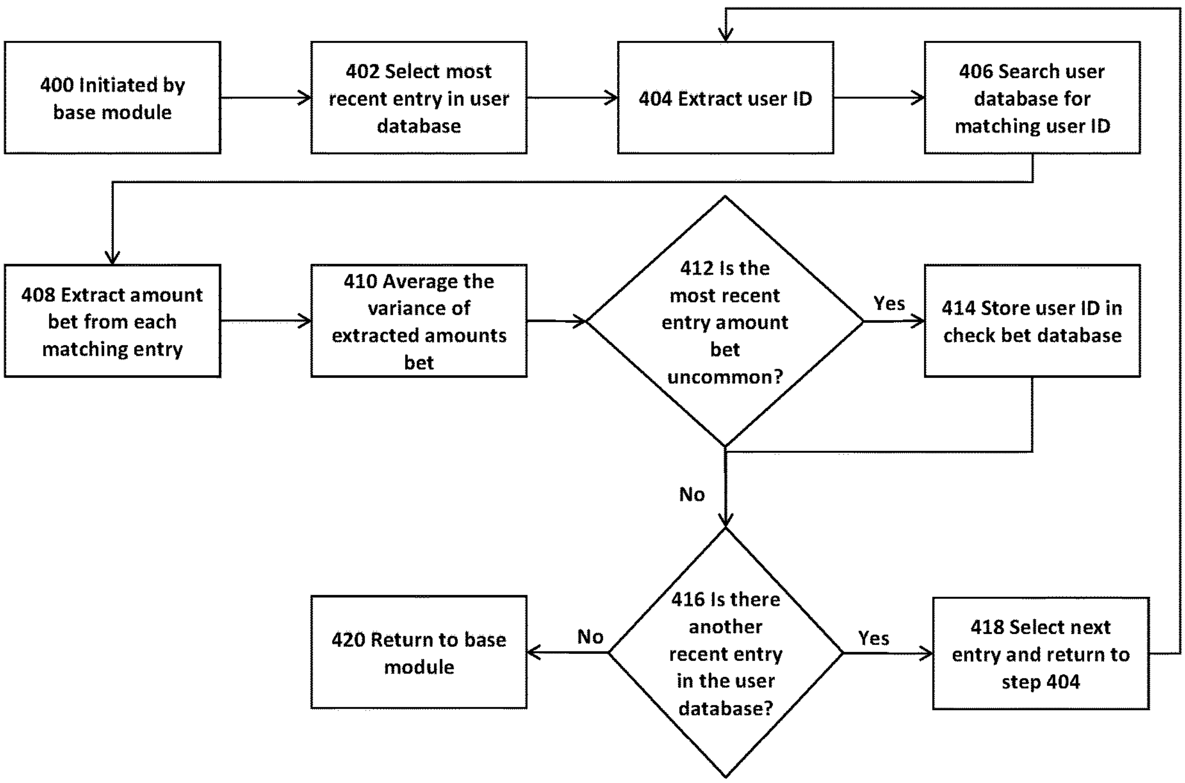
Fig.4 Sequence Bet Check Module

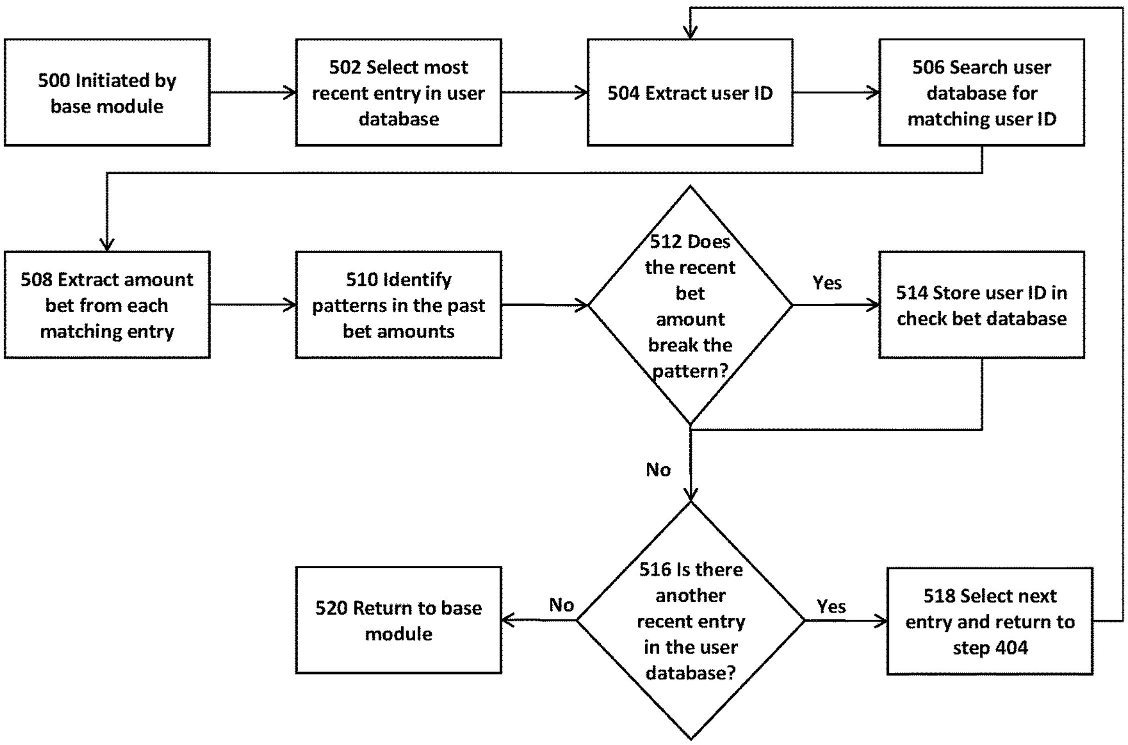
Fig.5 Pattern Bet Check Module
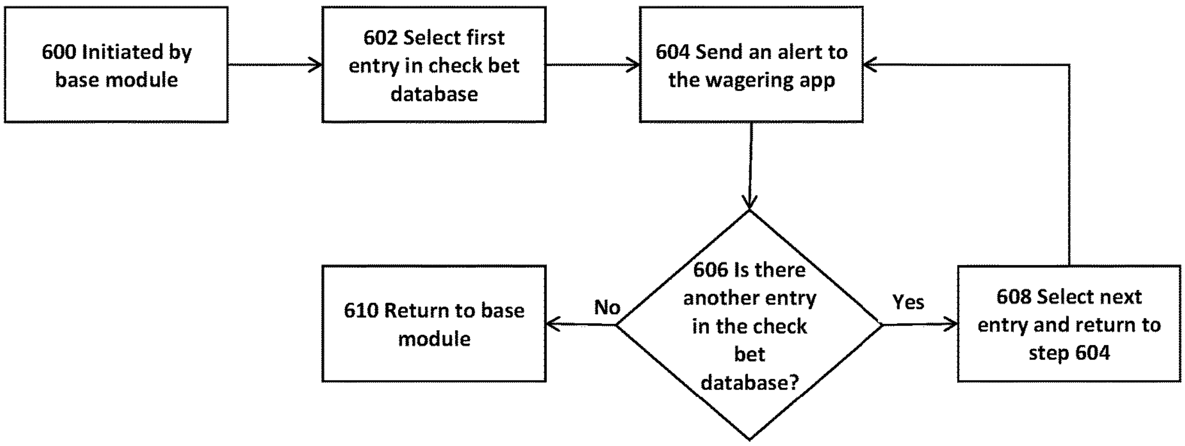
Fig.6 Alert Module

| User ID | Timestam | Flagging Module(s) |
|---|---|---|
| JS1234 | 9:38 PM | single bet check module |
| BG3344 | 9:55 PM | single bet check module, sequence bet check module |
| VF4567 | 10:22 PM | pattern bet check module |

Fig.7 Check Bet Database

METHOD OF NOTIFYING A USER ABOUT PLACING AN UNCOMMON BET

CROSS-REFERENCE TO RELATED APPLICATIONS

The present patent application claims benefit and priority to U.S. Provisional Patent Application No. 63/112,877 entitled "METHOD OF NOTIFYING A USER ABOUT PLACING AN UNCOMMON BET" filed on Nov. 12, 2020, which is hereby incorporated by reference into the present disclosure.

FIELD

The embodiments are generally related to play by play wagering on live sporting events.

BACKGROUND

Play-by-play wagering or micro-wagering has a very short time window since each play of a live event is often shorter than a few minutes.

This can lead to wagers that are placed very quickly and without careful checking by the bettor.

Thus, a problem with micro-wagering is that it is much more likely that an error in the betting amount may go unnoticed, for example, adding an extra digit to a wager amount and increasing the amount wagered by at least ten times.

SUMMARY

Methods and systems for detecting uncommon transactions in a wagering system. In one embodiment, a method can include receiving a wager on an action in a live sporting event from a user; associating the wager on the action in the live sporting event with a user ID; storing the wager on the action in the live sporting event in a wager database; comparing the wager on the action in the live sporting event to a plurality of previous wagers in a historical wager database; determining if the wager on the action in the live sporting event is uncommon based on the comparison of the wager on the action in the live sporting event to the plurality of previous wagers in the historical wager database; and automatically sending an alert if the wager on the action in the live sporting event is determined to be uncommon.

In another embodiment, a system for detecting an uncommon wager in a wagering game may be provided. The system can include a live sporting event; a wagering game provided on a wagering device; one or more wagers available on the wagering game on actions in the live sporting event; a wager made in the wagering game on an action in the live sporting event by a user; a wager database that stores the wager made in the wagering game on the action in the live sporting event; a historical wager database that stores previous wagers associated with at least the user; a bet check module that compares the wager made in the wagering game on the action in the live sporting event to one or more wagers in the historical wager database and determines if the wager is an uncommon wager; and an alert that is automatically generated and transmitted if the wager is determined to be an uncommon wager.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates an uncommon bet notification, according to an embodiment.

FIG. 2 illustrates a base module, according to an embodiment.

FIG. 3 illustrates a single bet check module, according to an embodiment.

FIG. 4 illustrates a sequence bet check module, according to an embodiment.

FIG. 5 illustrates a pattern bet check module, according to an embodiment.

FIG. 6 illustrates an alert module, according to an embodiment.

FIG. 7 illustrates a check bet database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A “bet” or “wager” is to risk something, usually a sum of money, against someone else’s or an entity on the basis of the outcome of a future event, such as the results of a game or event. It may be understood that non-monetary items may be the subject of a “bet” or “wager” as well, such as points or anything else that can be quantified for a “bet” or “wager”. A bettor refers to a person who bets or wagers. A bettor may also be referred to as a user, client, or participant throughout the present invention. A “bet” or “wager” could be made for obtaining or risking a coupon or some enhancements to the sporting event, such as better seats, VIP treatment, etc. A “bet” or “wager” can be done for certain amount or for a future time. A “bet” or “wager” can be done for being able to answer a question correctly. A “bet” or “wager” can be done within a certain period of time. A “bet” or “wager” can be integrated into the embodiments in a variety of manners.

A “book” or “sportsbook” refers to a physical establishment that accepts bets on the outcome of sporting events. A “book” or “sportsbook” system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A “book” or “sportsbook” can be integrated into the embodiments in a variety of manners.

To “buy points” means a player pays an additional price (more money) to receive a half-point or more in the player’s favor on a point spread game. Buying points means you can move a point spread, for example up to two points in your favor. “Buy points” can be integrated into the embodiments in a variety of manners.

The “price” refers to the odds or point spread of an event. To “take the price” means betting the underdog and receiving its advantage in the point spread. “Price” can be integrated into the embodiments in a variety of manners.

“No action” means a wager in which no money is lost or won, and the original bet amount is refunded. “No action” can be integrated into the embodiments in a variety of manners.

The “sides” are the two teams or individuals participating in an event: the underdog and the favorite. The term “favorite” refers to the team considered most likely to win an event or game. The “chalk” refers to a favorite, usually a heavy favorite. Bettors who like to bet big favorites are referred to “chalk eaters” (often a derogatory term). An event or game in which the sports book has reduced its betting limits, usually because of weather or the uncertain status of injured players is referred to as a “circled game.” “Laying the points or price” means betting the favorite by giving up points. The term “dog” or “underdog” refers to the team perceived to be most likely to lose an event or game. A “longshot” also refers to a team perceived to be unlikely to win an event or game. “Sides”, “favorite”, “chalk”, “circled game”, “laying the points price”, “dog” and “underdog” can be integrated into the embodiments in a variety of manners.

The “money line” refers to the odds expressed in terms of money. With money odds, whenever there is a minus (−) the player “lays” or is “laying” that amount to win (for example $100); where there is a plus (+) the player wins that amount for every $100 wagered. A “straight bet” refers to an individual wager on a game or event that will be determined by a point spread or money line. The term “straight-up” means winning the game without any regard to the “point spread”; a “money-line” bet. “Money line”, “straight bet”, “straight-up” can be integrated into the embodiments in a variety of manners.

The “line” refers to the current odds or point spread on a particular event or game. The “point spread” refers to the margin of points in which the favored team must win an event by to “cover the spread.” To “cover” means winning by more than the “point spread”. A handicap of the “point spread” value is given to the favorite team so bettors can choose sides at equal odds. “Cover the spread” means that a favorite win an event with the handicap considered or the underdog wins with additional points. To “push” refers to when the event or game ends with no winner or loser for wagering purposes, a tie for wagering purposes. A “tie” is a wager in which no money is lost or won because the teams’ scores were equal to the number of points in the given “point spread”. The “opening line” means the earliest line posted for a particular sporting event or game. The term “pick” or “pick ’em” refers to a game when neither team is favored in an event or game. “Line”, “cover the spread”, “cover”, “tie”, “pick” and “pick-em” can be integrated into the embodiments in a variety of manners.

To “middle” means to win both sides of a game; wagering on the “underdog” at one point spread and the favorite at a different point spread and winning both sides. For example, if the player bets the underdog +4½ and the favorite −3½ and the favorite wins by 4, the player has middled the book and won both bets. “Middle” can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. “eSports” refers to a form of sports competition using video games, or a multiplayer video game played competitively for spectators, typically by professional gamers. Digital gaming and “eSports” can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for uncommon bet notifications. This system may include a live event 102, for example, a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including a straight bet, a money line bet, a bet with a point spread or line that the bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk. This is typically applied to round-robin or other tournaments' styles. There are other types of wagers, including parlays, teasers, and prop bets, that are added games that often allow the user to customize their betting by changing the odds and payouts they receive on a wager. Certain sportsbooks will allow the bettor to buy points, to move the point spread off of the opening line. This will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have several bets they can handle, a limit of wagers they can take on either side of a bet before they will move the line or odds off of the opening line. Additionally, there are circumstances, such as an injury to an important player such as a listed pitcher, in which a sportsbook, casino, or racino will take an available wager off the board. As the line moves, there becomes an opportunity for a bettor to bet on both sides at different points, spreads to middle, and win both bets. Sportsbooks will often offer bets on portions of games, such as first-half bets and half-time bets. Additionally, the sportsbook can offer futures bets on live events 102 in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, optical sensors and cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices, etc. Also, the plurality of sensors 104 may include tracking devices, such as RFID tags, GPS chips, or other such devices embedded on uniforms, in equipment, in the field of play, in the boundaries of the field of play, or on other markers on the field of play. Imaging devices may also be used as tracking devices such as player tracking that provides statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques that are known in the art. The communication network may allow ubiquitous access to shared pools of configurable system resources and higher-level services that can be rapidly provisioned with minimal management effort, often over the internet, and relies on sharing of resources to achieve coherence and economies of scale, like a public utility. In contrast, third-party clouds allow organizations to focus on their core businesses instead of expending resources on computer infrastructure and maintenance. Cloud 106 may be communicatively coupled to a peer-to-peer wagering network 114, which may perform real-time analysis on the type of play and the result of the play. The cloud 106 may also be synchronized with game situational data, such as the time of the game, the score, location on the field, weather conditions, and the like, which may affect the choice of play utilized. For example, in other exemplary embodiments, the cloud 106 may not receive data gathered from the sensors 104 and may, instead, receive data from an alternative data feed, such as Sports Radar®. This data may be compiled substantially immediately following the completion of any play, and the data from this feed may be compared with a variety of team data and league data based on a variety of elements, including down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple iPhone. Some devices allow gesture recognition inputs by combining some of the inputs and outputs. Some devices allow for facial recognition, which may be utilized as an input for different purposes, including authentication and other commands. Some devices provide for voice recognition and inputs, including, e.g., Microsoft KINECT, SIRI for iPhone by Apple, Google Now, or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control the I/O devices. The I/O controller may control one or more I/O devices, such as e.g., a keyboard and a pointing device, e.g., a mouse or optical pen. Furthermore, an I/O device may also contain storage and/or an installation medium for the computing device. In still some embodiments, the computing device may include USB connections (not shown) to receive handheld USB storage devices. In further embodiments, an I/O device may be a bridge between the system bus and an external communication bus, e.g., a USB bus, a SCSI bus, a FireWire bus, an Ethernet bus, a Gigabit Ethernet bus, a Fiber Channel bus, or a Thunderbolt bus. In some embodiments, the mobile device 108 could be an optional component and would be utilized in a situation where a paired wearable device utilizes the mobile device 108 as additional memory or computing power or connection to the internet.

Further, embodiments may include a wagering software application or a wagering app 110, which is a program that enables the user to place bets on individual plays in the live event 102 and display the audio and video from the live event 102, along with the available wagers on the mobile device 108. The wagering app 110 allows the user to interact with the wagering network 114 to place bets and provide payment/receive funds based on wager outcomes.

Further, embodiments may include a mobile device database 112 that may store some or all of the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplar embodiments, the wagering network 114 may not receive data gathered from the sensors 104 and may, instead, receive data from an alternative data feed, such as SportsRadar®. This data may be provided substantially immediately following the completion of any play, and the data from this feed may be compared with a variety of team data and league data based on a variety of elements, including down, possession, score, time, team, and so forth, as described in various exemplary embodiments herein. The wagering network 114 can offer several software as a service managed services such as user interface service, risk management service, compliance, pricing and trading service, IT support of the technology platform, business applications, game configuration, state-based integration, fantasy sports connection, integration to allow the joining of social media, as well as marketing support services that can deliver engaging promotions to the user.

Further, embodiments may include a user database 116, which may contain data relevant to all users of the wagering network 114, and which may include a user ID, a device identifier, a paired device identifier, wagering history, and wallet information for the user. The user database 116 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 116 may contain betting lines and search queries. The user database 116 may be searched based on a search criterion received from the user. Each betting line may include a plurality of betting attributes such as at least one of the live event 102, a team, a player, an amount of wager, etc. The user database 116 may include information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120 that contains the odds calculated by an odds calculation module 122 to display the odds on the user's mobile device 108 and to take bets from the user through the mobile device wagering app 110.

Further, embodiments may include the odds calculation module 122, which utilizes historical play data to calculate odds for in-play wagers Further, embodiments may include a base module 124, which may initiate a single bet check module 126, a sequence bet check module 128, a pattern bet check module 130, and an alert module 132.

Further, embodiments may include the single bet check module 126, which may determine if the amount wagered on a single bet is far outside the usual bet amount for a user.

Further, embodiments may include the sequence bet check module 128, which may determine if the change in the amount wagered on a sequence of bets is far outside the usual change in the amount wagered from bet to bet made by a user.

Further, embodiments may include the pattern bet check module 130, which may determine if there is any variance from the normal pattern of betting for a user or any unusual pattern in the betting behavior of a user.

Further, embodiments may include the alert module 132, which may alert a user of uncommon betting behavior and require the user to verify their bet.

Further, embodiments may include a check bet database 134, which may contain user IDs of users who have been flagged for uncommon betting behavior by the single bet check module 126, the sequence bet check module 128, the pattern bet check module 130, or any combination of these modules. The contained user IDs may then be used by the alert module 132 to identify the users that need to be alerted.

FIG. 2 illustrates the base module 124. The process may begin with the base module 124 polling, at step 200, for new wager data in the user database 116. A new data event may correspond with a user placing a wager on the live event 102. The base module 124 may initiate, at step 202, the single bet check module 126, which may determine if a single bet is uncommon because of a large deviation from the average betting amount for a user. The base module 124 may initiate, at step 204, the sequence bet check module 128, which may determine if a single or sequence of bets are uncommon because of a large deviation from the average change in betting amount from bet to bet for a user. The base module 124 may initiate, at step 206, the pattern bet check module 130, which may determine if a single or sequence of bets are uncommon because of a large deviation from a user's normal betting behavior pattern. The base module 124 may initiate, at step 208, the alert module 132, which may alert a user when one or more of their wagers have been flagged as uncommon. The base module 124 may return, at step 210, to step 200.

FIG. 3 illustrates the single bet check module 126. The process may begin with the single bet check module 126 being initiated, at step 300, by the base module 124. The single bet check module 126 may select, at step 302, the most recent entry in the user database 116. The data within the entry may be the most recently placed bet by a user. The single bet check module 126 may extract, at step 304, the user ID of the selected entry. The single bet check module 126 may search, at step 306, the user database 116 for entries with a matching user ID to the extracted user ID. This search may find all bets placed by the user. The search may be limited to a certain time frame, for example, the last year. The single bet check module 126 may extract, at step 308, the amount bet from each matching entry. The single bet check module 126 may average, at step 310, the extracted amounts bet from each entry. The average may be, for example, a mean, median, mode, or other statistical value that characterizes a common trend of data. The single bet check module 126 may determine, at step 312, if the amount bet in the selected entry is uncommon compared to the average betting amounts for the user. For example, if the amount bet is three times as large as the average for that user, it may be uncommon. An uncommon betting amount may also be determined using a different multiplier, for example, twelve times larger. The threshold for which bets are flagged as uncommon may be set by an administrator of the system or another module. For example, user Joe has an average wager amount of $10. A system administrator may set a threshold for an uncommon wager at greater than three times the user's mean average amount. In this example, a threshold for an uncommon wager for user joe would be any wager above $30. An uncommon betting amount may also be determined using statistical concepts such as the variance or standard deviation. If the amount of the bet is not uncommon, the single bet check module 126 may skip to step 316. If the amount bet is uncommon, the single bet check module 126 may store, at step 314, the user ID in the check bet database 134. The single bet check module 126 may also store a timestamp of when the uncommon bet was made or identified. The check bet database 134 may record that the uncommon bet was flagged by the single bet check module 126. The single bet check module 126 may determine, at step 316, if there is another recent entry in the user database 116 that has not been checked. Recent may mean that bets from the last play of the live event 102 are excluded or may refer to a fixed time window. If there is another recent entry in the user database 116, the single bet check module 126 may select, at step 318, the next entry and may return to step 304. If there is not another recent entry in the user database 116, The single bet check module 126 may end at step 320.

FIG. 4 illustrates the sequence bet check module 128. The process may begin with the sequence bet check module 128 being initiated, at step 400, by the base module 124. The sequence bet check module 128 may select, at step 402, the most recent entry in the user database 116. The data within the entry may be the most recently placed bet by a user. The sequence bet check module 128 may extract, at step 404, the user ID of the selected entry. The sequence bet check module 128 may search, at step 406, the user database 116 for entries with a matching user ID to the extracted user ID. This search may find all bets placed by the user. The search may be limited to a certain time frame, for example, the last year. The sequence bet check module 128 may extract, at step 408, the amount bet from each matching entry. The sequence bet check module 128 may average, at step 410, the variance from one bet to the next bet between the extracted amounts bet from each entry to determine the average variance between the user's bets. For example, an entry for a user has a bet amount of $20. The next-in-time entry for the same user has a bet amount of $25. The variance between these two bets is 25% since the first amount of $20 would have to be increased by 25% to be $25. The average may be, for example, a mean, median, mode, or other statistical value that characterizes a common trend of data. The sequence bet check module 128 may determine, at step 412, if the amount bet in the selected entry is uncommon compared to the average change in betting amounts for the user for bets in sequence. If the amount bet is three times as large as the average variance between sequential bets for that user, it may be determined to be uncommon. For example, the user's average betting variance is 25%. This means that when a user makes a bet, the next bet will be 25% larger or, inversely, 20% smaller on average. If the most recent amount bet by the user is 75% greater than the last bet the user placed, then the most recent amount bet may be uncommon. An uncommon betting amount may be flagged after a sequence of betting amounts that are uncommon. An uncommon betting amount may also be determined using a different multiplier, for example, twelve times larger. The threshold for which bets are flagged as uncommon may be set by an administrator of the system or another module. For example, user Joe has an average wager amount variance of 30%. The last wager Joe made was $10. A system administrator may set a threshold for an uncommon wager at greater than ten times the user's mean average variance amount. In this example, the threshold for an uncommon wager for user Joe would be any wager that is 300% larger or, inversely, 75% smaller than the last wager placed, $40 or $2.50, respectively. Variance in the positive and negative direction may be evaluated separately. An uncommon betting amount may also be determined using statistical concepts such as the standard deviation. If the amount bet is not uncommon, the sequence bet check module 128 skips to step 416. If the amount bet is uncommon, the sequence bet check module 128 may store, at step 414, the user ID in the check bet database 134. The sequence bet check module 128 may also store a timestamp of when the uncommon bet was made or identified. The check bet database 134 may record that the uncommon bet was flagged by the sequence bet check module 128. The sequence bet check module 128 may determine, at step 416, if there is another recent entry in the user database 116 that has not been checked. Recent may mean that bets from the last play of the live event 102 are excluded or may refer to a fixed time window. If there is another recent entry in the user database 116, the sequence bet check module 128 may select, at step 418, the next entry and may return to step 404. If there is no recent entry in the user database 116, The sequence bet check module 128 may return to the base module 124 at step 420.

FIG. 5 illustrates the pattern bet check module 130. The process may begin with the pattern bet check module 130 being initiated, at step 500, by the base module 124. The pattern bet check module 130 may select, at step 502, the most recent entry in the user database 116. The data within the entry may be the most recently placed bet by a user. The pattern bet check module 130 may extract, at step 504, the user ID of the selected entry. The pattern bet check module 130 may search, at step 506, the user database 116 for entries with a matching user ID to the extracted user ID. This may find all bets placed by the user. The search may be limited to a certain time frame, for example, the last year. The pattern bet check module 130 may extract, at step 508, the amount of the bet from each matching entry. The pattern bet check module 130 may identify, at step 510, a pattern to the betting behavior of the user. For example, the user may usually bet low amounts at the beginning of the live event 102 and higher amounts later. Other data may be included to better define patterns such as game type, teams, time, results of the previous bet, weather, day of the week, etc. These patterns may be detected using pattern recognition algorithms which may involve artificial intelligence. Further, the pattern bet check module 130 may evaluate the time when a user makes a wager. For example, if a user always or frequently places a wager shortly before the closing of a wager time window and then makes a wager as soon as a time window for a wager opens, that could be deemed an uncommon wager. Other examples could include an uncommon wager has been placed by a user who places multiple wagers on a single play when they historically only make one wager on a single play, if a user wagers on a number of consecutive plays when they typically wager less frequently, or a user cancels or changes a wager when they historically have not canceled or changed a wager. The pattern bet check module 130 may look at the patterns of similar users if there is insufficient data on the user. For example, the pattern check module 130 can look at other users with similar betting habits or bankrolls. Alternatively the pattern check module 130 could evaluate a user's betting activity in comparison to known bettors who historically place larger wagers (e.g. "high rollers" or "whales") to see if there is a correlation between such wagers, which could indicate the sharing of data from the high rollers or whales, or potential hacking or otherwise unauthorized use of data. The pattern bet check module 130 may also detect patterns that may indicate that a user is using an automated wagering bot, has a gambling problem, has had their account taken by another person, etc. The pattern bet check module 130 may determine, at step 512, if the amount bet in the selected entry is uncommon compared to the usual pattern behavior of the user. If the amount bet is larger or smaller by a threshold percentage or value than the expected bet, it may be determined to be uncommon. The expected bet may be estimated based on a user's past betting behavior. For example, user Joe has a history of betting on average 50% larger amounts after each win and 20% smaller amounts after a loss. Joe bet $10 on the last play and lost. Based on Joe's historical behavior, the system calculates an expected next bet of 20% less than $10 or $8. A system administrator may set a threshold for an uncommon wager at five times larger than the expected amount Joe would bet based on Joe's betting pattern. In this example, the threshold for an uncommon wager for user Joe would be any amount above $40. A different percentage or value may be used for the upper and lower threshold. For example, a 400% increase or a 95% decrease may cause a wager amount to be flagged as uncommon. For example, a user who is expected to bet $1000 in a given context based on their past behavior enters a wager amount of $10; it may be flagged as uncommon as the user may have miss entered the number of zeros in their wager amount. An uncommon betting amount may be flagged after a sequence of betting amounts that are uncommon based on the past betting behavior of the user. The threshold for which bets are flagged as uncommon may be set by an administrator of the system or another module. If the amount bet is not uncommon, the pattern bet check module 130 skips to step 516. If the amount bet is uncommon, the pattern bet check module 130 may store, at step 514, the user ID in the check bet database 134. The pattern bet check module 130 may also store a timestamp of when the uncommon bet was made or identified. The check bet database 134 may record that the uncommon bet was flagged by the pattern bet check module 130. The pattern bet check module 130 may determine, at step 516, if there is another recent entry in the user database 116 that has not been checked. Recent may mean that bets from the last play of the live event 102 are excluded or may refer to a fixed time window. If there is another recent entry in the user database 116, the pattern bet check module 130 may select, at step 518, the next entry and may return to step 504. If there is no recent entry in the user database 116, The pattern bet check module 130 may return to the base module 124 at step 520.

FIG. 6 illustrates the alert module 132. The process may begin with the alert module 132 being, at step 600, initiated by the base module 124. The alert module 132 may select, at step 602, the first entry in the check bet database 134. The first entry may refer to the earliest in time, the first location in memory, the highest priority entry, etc. The alert module 132 may send, at step 604, an alert to the wagering app 110 on the mobile device 108 associated with the user ID of the selected entry. The alert may be a notification of an uncommon bet, for example, a message that reads "Did you mean to bet [amount bet]?" or "This wager is uncommon for you. You may want to cancel the wager if there is an error". The alert may contain elements that may require user interaction to finalize the wager, for example, a pop-up that reads "Are you sure you want to bet [amount bet]?" and two buttons that read "yes" and "no." In which case the wager may be canceled if the user does not press the "yes" button within a time window. The alert module 132 may determine, at step 606, if there is another entry in the check bet database 134. If there is another entry in the check bet database 134, the alert module 132 may select, at step 608, the next entry and may return to step 604. If there are no more entries in the check bet database, the alert module 132 may end at step 610. The alert module 132 may delete all the entries in the check bet database or note which entries have caused an alert.

FIG. 7 illustrates the check bet database 134. The check bet database 134 may contain a user ID, such as JS1234, a timestamp, for example, 9:38 PM, and which module or modules flagged the user for uncommon betting behavior, for example, "single bet check module."

It should be understood that the embodiments and examples discussed herein are merely exemplary and are non-limiting.

What is claimed is:

1. A method for detecting uncommon transactions in a wagering system, the method comprising:

receiving a wager on an action in a live sporting event from a user;

associating the wager on the action in the live sporting event with a user ID;

storing the wager on the action in the live sporting event in a wager database;

comparing the wager on the action in the live sporting event to a plurality of previous wagers in a historical wager database;

determining that the wager on the action in the live sporting event is uncommon based on the comparison of the wager on the action in the live sporting event to the plurality of previous wagers in the historical wager database;

automatically sending an alert to the user after the wager on the action in the live sporting event is determined to be uncommon; and requesting the user to verify the uncommon wager.

2. The method for detecting uncommon transaction in the wagering system of claim 1, wherein the alert is sent to a mobile device associated with the user.

3. The method for detecting uncommon transaction in the wagering system of claim 1, wherein the comparing of the wager on the action in the live sporting event is done with respect to a plurality of previous wagers associated with the user ID in the historical wager database.

4. The method for detecting uncommon transaction in the wagering system of claim 2, wherein the plurality of previous wagers are wagers made during the live sporting event.

5. The method for detecting uncommon transaction in the wagering system of claim 2, wherein the plurality of previous wagers are wagers made in at least one of the live sporting event and one or more previous live sporting events that occurred within a predetermined time.

6. The method for detecting uncommon transaction in the wagering system of claim 1, wherein the comparing of the wager on the action in the live sporting event is done with respect to a plurality of previous wagers associated with other users in the historical wager database.

7. The method for detecting uncommon transaction in the wagering system of claim 6, wherein the other users are determined to be similar to the user who placed the wager on the action in the live sporting event by artificial intelligence.

8. The method for detecting uncommon transaction in the wagering system of claim 1, wherein the wager on the action in the live sporting event is determined to be uncommon after the wager on the action in the live sporting event falls outside of a variance percentage of a variance of the plurality of previous wagers in the historical wager database.

9. The method for detecting uncommon transaction in the wagering system of claim 1, wherein the wager on the action in the live sporting event is determined to be uncommon after artificial intelligence determines that the wager on the action in the live sporting event does not fit a wager pattern associated with the user ID.

10. The method for detecting uncommon transaction in the wagering system of claim 1, wherein the wager pattern is a time when wagers are placed during an open time window for placing wagers.

11. The method for detecting uncommon transaction in the wagering system of claim 10, wherein the wager pattern is a frequency of wagers made on a single play.

12. The method for detecting uncommon transaction in the wagering system of claim 10, wherein the wager pattern is a pattern associated with other users having similar betting habits.

13. The method for detecting uncommon transaction in the wagering system of claim 10, wherein the wager pattern is compared with other users who historically placed larger wagers than the wagers associated with the user ID.

14. The method of claim 1, further comprising:

canceling the uncommon wager after the user fails to verify the uncommon wager during a time window.

15. A system for detecting an uncommon wager in a wagering game, the system comprising:

a live sporting event;

a wagering game provided on a wagering device;

one or more wagers available on the wagering game on actions in the live sporting event;

a wager made in the wagering game on an action in the live sporting event by a user;

a wager database that stores the wager made in the wagering game on the action in the live sporting event;

a historical wager database that stores previous wagers associated with at least the user; and a bet check module that compares the wager made in the wagering game on the action in the live sporting event to one or more wagers in the historical wager database and determines that the wager is an uncommon wager, wherein an alert that automatically generated and transmitted after the wager is determined to be an uncommon wager and the user is requested to verify the uncommon wager.

16. The system for detecting the uncommon wager in the wagering game of claim 15, wherein the historical wager database stores wagers associated with the user, and the wagers have been placed during a predefined time period.

17. The system for detecting the uncommon wager in the wagering game of claim 16, wherein the predefined time period is between a start of the live sporting event and a time the wager on the action in the live sporting event was made.

18. The system for detecting the uncommon wager in the wagering game of claim 15, wherein the bet check module analyzes the previous wagers in the historical wager database to determine that there is a betting pattern associated with the user.

19. The system for detecting the uncommon wager in the wagering game of claim 18, wherein the bet check module determines the wager made on the action in the live sporting event to be uncommon after it falls outside of the betting pattern determined by the bet check module.

20. The method of claim 15, further comprising pausing the wager until it is verified.

* * * * *